United States Patent
Manolakos et al.

(10) Patent No.: US 11,006,454 B2
(45) Date of Patent: *May 11, 2021

(54) COLLISION MITIGATION OF REFERENCE SIGNALS AND A DIRECT CURRENT SUBCARRIER IN WIRELESS COMMUNICATION SYSTEMS

(71) Applicant: QUALCOMM Incorporated, San Diego, CA (US)

(72) Inventors: Alexandros Manolakos, San Diego, CA (US); Joseph Binamira Soriaga, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,908

(22) Filed: Sep. 25, 2019

(65) Prior Publication Data

US 2020/0022186 A1    Jan. 16, 2020

Related U.S. Application Data

(63) Continuation of application No. 15/972,934, filed on May 7, 2018, now Pat. No. 10,455,619.

(Continued)

(51) Int. Cl.
*H04W 74/08*    (2009.01)
*H04W 28/02*    (2009.01)
(Continued)

(52) U.S. Cl.
CPC ....... *H04W 74/0825* (2013.01); *H04L 5/0048* (2013.01); *H04L 5/0051* (2013.01);
(Continued)

(58) Field of Classification Search
CPC . H04W 28/0236; H04W 36/20; H04W 40/16; H04W 52/0238; H04W 52/243;
(Continued)

(56) References Cited

U.S. PATENT DOCUMENTS

| 2017/0245278 A1 | 8/2017 | Xue et al. |
| 2018/0205581 A1 | 7/2018 | Kim et al. |
| 2018/0332619 A1 | 11/2018 | Manolakos et al. |

FOREIGN PATENT DOCUMENTS

WO    WO-2017039373 A1 *    3/2017    .......... H04J 11/0069

OTHER PUBLICATIONS

International Search Report and Written Opinion—PCT/US2018/031627—ISA/EPO—dated Aug. 2, 2018.

(Continued)

*Primary Examiner* — Ashley Shivers
(74) *Attorney, Agent, or Firm* — Arent Fox LLP

(57) ABSTRACT

The present disclosure relates to mitigating collision between reference signals and direct current subcarriers both occupying at least a same resource element of a resource block. Specifically, a UE may at least adjust a DMRS pattern within the resource block based on determining an upcoming occurrence of the collision between the DMRS and the DC subcarrier. Further, a network entity may determine that the UE should transmit the DMRS according to an adjusted DMRS pattern and transmit the adjusted DMRS pattern to the UE on a downlink communication channel.

30 Claims, 9 Drawing Sheets

Related U.S. Application Data

(60) Provisional application No. 62/505,452, filed on May 12, 2017.

(51) Int. Cl.
*H04W 72/08* (2009.01)
*H04L 5/00* (2006.01)
*H04L 27/26* (2006.01)

(52) U.S. Cl.
CPC ..... *H04L 27/2613* (2013.01); *H04W 28/0236* (2013.01); *H04W 72/082* (2013.01); *H04W 74/0816* (2013.01); *H04L 5/0007* (2013.01)

(58) Field of Classification Search
CPC ............. H04W 52/244; H04W 72/082; H04W 74/0816; H04W 74/0825; H04W 74/0841; H04W 74/085; H04W 74/0858; H04L 12/413; H04L 25/08; H04L 25/085; H04L 27/2691

See application file for complete search history.

(56) References Cited

OTHER PUBLICATIONS

Qualcomm Incorporated: "Discussion on UL DMRS Design," 3GPP Draft; R1-1708595 Discussion on UL DMRS Design, 3rd Generation Partnership Project (3GPP), Mobile Competence Centre; 650, Route Des Lucioles; F-06921, Sophia-Antipolis Cedex; France, vol. RAN WG1, No. Hangzhou, CN; May 15, 2017-May 19, 2017, May 7, 2017, XP051263234, 4 pages, Retrieved from the Internet: URL: http://www.3gpp.org/ftp/tsg_ran/WG1_RL1/TSGR1_89/Docs/ [retrieved on May 7, 2017].

Qualcomm Incorporated: "Evaluation of UL DMRS Design," 3GPP Draft; R1-1708597, 3rd Generation Partnership Project (3GPP), Mobile Competence Centre; 650, Route Des Lucioles; F-06921 Sophia-Antipolis Cedex, France, vol. Ran WG1, No. Hangzhou, China; May 15, 2017-May 19, 2017, May 7, 2017, XP051263236, 5 Pages, and Retrieved from the Internet: URL: http://www.3gpp.org/ftp/tsg_ran/WG1_RL1/TSGR1_89/Docs/ [retrieved on May 7, 2017].

Samsung: "DC Subcarrier Handling," 3GPP Draft; R1-1709042 (DC Subcarrier Handling), 3rd Generation Partnership Project (3GPP), Mobile Competence Centre; 650, Route Des Lucioles; F-06921 Sophia-Antipolis Cedex, France, vol. RAN WG1, No. Hangzhou, China; May 15, 2017-May 19, 2017, May 5, 2017, XP051261484, 3 Pages, Retrieved from the Internet: URL: http://www.3gpp.org/ftp/tsg_ran/WG1_RL1/TSGR1_89/Docs/ [retrieved on May 5, 2017].

\* cited by examiner

COLLISION MITIGATION OF REFERENCE SIGNALS AND A DIRECT CURRENT SUBCARRIER IN WIRELESS COMMUNICATION SYSTEMS

CROSS-REFERENCE TO RELATED APPLICATION(S)

This application is continuation of U.S. Non-Provisional application Ser. No. 15/972,934, entitled "COLLISION MITIGATION OF REFERENCE SIGNALS AND A DIRECT CURRENT SUBCARRIER IN WIRELESS COMMUNICATION SYSTEMS" filed on May 7, 2018, which issued as U.S. Pat. No. 10,455,619 on Oct. 22, 2019, and U.S. Provisional Application Ser. No. 62/505,452, entitled "COLLISION MITIGATION OF REFERENCE SIGNALS AND A DIRECT CURRENT SUBCARRIER IN WIRELESS COMMUNICATION SYSTEMS" and filed on May 12, 2017, both of which are expressly incorporated by reference herein in its entirety.

BACKGROUND

Aspects of the present disclosure relate generally to wireless communication networks, and more particularly, to collision mitigation of reference signals and direct current tones in wireless communications systems such as new radio.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, collisions between reference signals and direct current (DC) subcarriers on the uplink may inhibit a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method for wireless communications at a user equipment (UE). The method may include determining an upcoming occurrence of a collision between a demodulation reference signal (DMRS) and a direct current (DC) subcarrier, the occurrence of the collision being that both the DMRS and the DC subcarrier occupy at least a same resource element within a resource block in a scheduled uplink transmission. The method may further include adjusting a DMRS pattern within at least the resource block based on determining the upcoming occurrence of the collision.

In another aspect, the present disclosure includes an apparatus for wireless communications. The apparatus may include means for determining an upcoming occurrence of a collision between a DMRS and a DC subcarrier, the occurrence of the collision being that both the DMRS and the DC subcarrier occupy at least a same resource element within a resource block in a scheduled uplink transmission. The apparatus may further include means for adjusting a DMRS pattern within at least the resource block based on determining the upcoming occurrence of the collision.

In an additional aspect, the present disclosure includes a computer-readable medium storing computer executable code for wireless communications. The computer-readable medium may include code for determining an upcoming occurrence of a collision between a DMRS and a DC subcarrier, the occurrence of the collision being that both the DMRS and the DC subcarrier occupy at least a same resource element within a resource block in a scheduled uplink transmission. The computer-readable medium may further include code for adjusting a DMRS pattern within at least the resource block based on determining the upcoming occurrence of the collision.

In yet another aspect, the present disclosure includes an apparatus for wireless communications comprising a memory and a processor coupled to the memory. The processor may be configured to determine an upcoming occurrence of a collision between a DMRS and a DC subcarrier, the occurrence of the collision being that both the DMRS and the DC subcarrier occupy at least a same resource element within a resource block in a scheduled uplink transmission. The processor may be further configured to adjust a DMRS pattern within at least the resource block based on determining the upcoming occurrence of the collision.

In an aspect, the present disclosure includes a method for wireless communications at a network entity. The method may include determining an upcoming occurrence of a collision between a DMRS and a DC subcarrier, the occurrence of the collision being that both the DMRS and the DC subcarrier occupy at least a same resource element within a resource block in a scheduled uplink transmission from a UE. The method may further include determining that the UE should transmit the DMRS according to an adjusted DMRS pattern. Moreover, the method may include transmitting the adjusted DMRS pattern to the UE on a downlink communication channel.

In another aspect, the present disclosure includes an apparatus for wireless communications. The apparatus may include means for determining an upcoming occurrence of a collision between a DMRS and a DC subcarrier, the occurrence of the collision being that both the DMRS and the DC subcarrier occupy at least a same resource element within a resource block in a scheduled uplink transmission from a UE. The apparatus may further include means for determining that the UE should transmit the DMRS according to an adjusted DMRS pattern. Moreover, the apparatus may include means for transmitting the adjusted DMRS pattern to the UE on a downlink communication channel.

In an additional aspect, the present disclosure includes a computer-readable medium storing computer executable code for wireless communications. The computer-readable medium may include code for determining an upcoming occurrence of a collision between a DMRS and a DC subcarrier, the occurrence of the collision being that both the DMRS and the DC subcarrier occupy at least a same resource element within a resource block in a scheduled uplink transmission from a UE. The computer-readable medium may further include code for determining that the UE should transmit the DMRS according to an adjusted DMRS pattern. Moreover, the computer-readable medium may include code for transmitting the adjusted DMRS pattern to the UE on a downlink communication channel.

In yet another aspect, the present disclosure includes an apparatus for wireless communications comprising a memory and a processor coupled to the memory. The processor may be configured to determine an upcoming occurrence of a collision between a DMRS and a DC subcarrier, the occurrence of the collision being that both the DMRS and the DC subcarrier occupy at least a same resource element within a resource block in a scheduled uplink transmission from a UE. The processor may further be configured to determine that the UE should transmit the DMRS according to an adjusted DMRS pattern. Moreover, the apparatus may be configured to transmit the adjusted DMRS pattern to the UE on a downlink communication channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
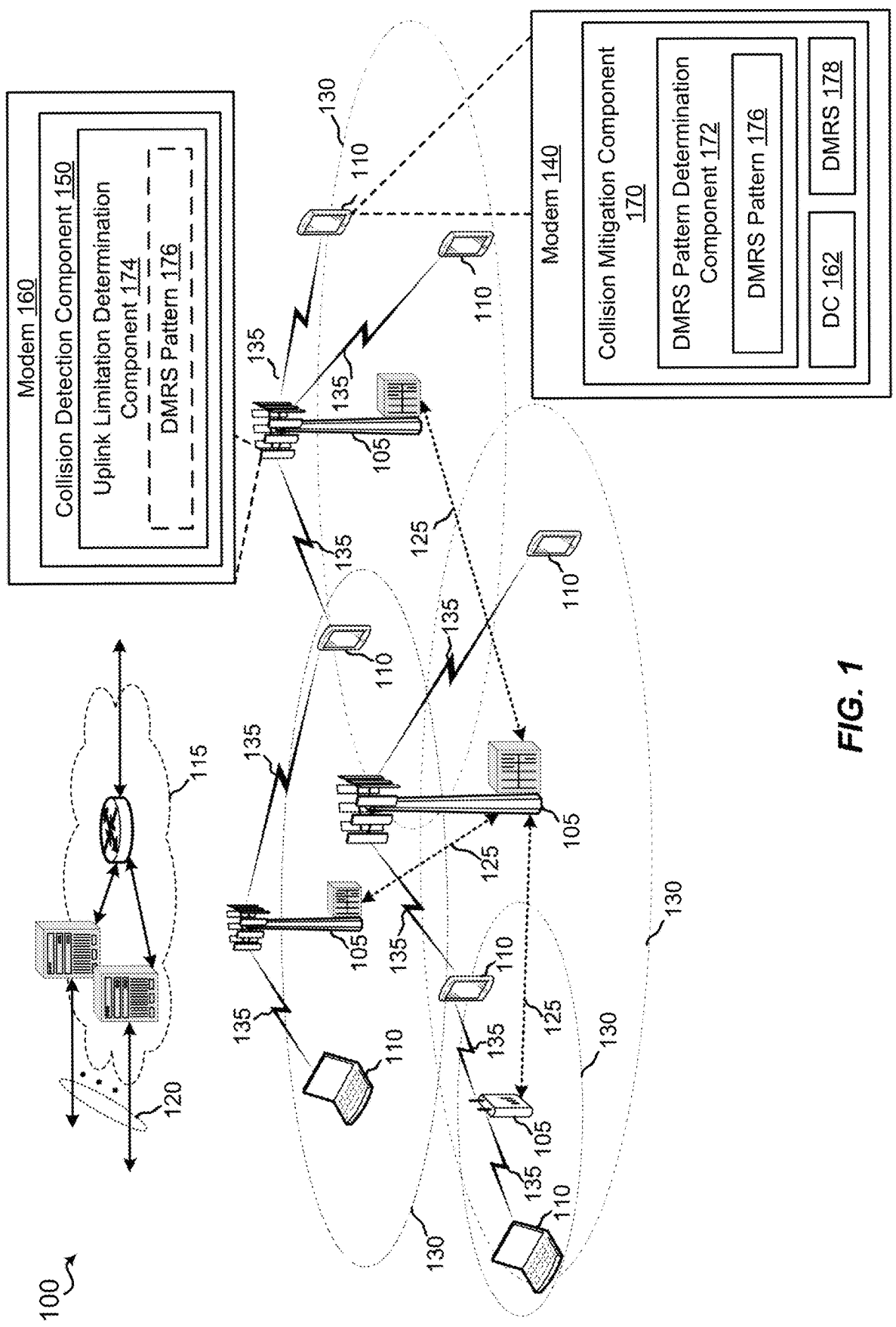
FIG. 1 is a schematic diagram of an example wireless communication network including at least one base station having a collision detection component and at least one user equipment (UE) having a collision mitigation component.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to mitigating collisions, or at least the effect of collisions between reference signals such as a demodulation reference signal (DMRS) and a direct current (DC) subcarrier. For example, during uplink transmission, a user equipment (UE) may transmit a DMRS within a slot for channel estimation. However, the DMRS may be scheduled on resources also occupied by a DC subcarrier, which may be used to locate a center of an OFDM frequency band (e.g., at least one of the OFDM symbols may be the DC subcarrier). Further, one or more resource elements on which the DC subcarrier is transmitted may be of lower error vector magnitude (EVM), which may be a measurement quantifying a performance of a radio transmitter/receiver. These resource elements may correspondingly be of lower quality, and so much so that the UE may have difficulty in transmitting the DC subcarrier. As such, when the DMRS is scheduled on a resource element occupied by the DC subcarrier, a collision may occur and result in unreliable or corrupt channel estimation for that DMRS. Further, in instances where a low resource block grant is provided by the network, such a loss of DMRS transmissions may adversely affect channel estimation at the UE, resulting in potentially poor uplink transmissions. Thus, it may be desirable for the UE to adjust a DMRS pattern such that collision with the DC subcarrier is mitigated, or in some instances, avoided entirely.

Accordingly, the present aspects may mitigate collisions between DMRS and a DC subcarrier. For example, in some aspects, a UE may determine an upcoming occurrence of a collision between a DMRS and a DC subcarrier both occupying at least a same resource element within a resource block in a scheduled uplink transmission. Further, the UE may adjust a DMRS pattern within at least the resource block based on determining the upcoming occurrence of the collision between the DMRS and the DC subcarrier both occupying the at least a same resource element of the resource block in the scheduled uplink transmission. Additionally, in some aspects, a network entity (e.g., eNB) may determine an upcoming occurrence of a collision between a DMRS and a DC subcarrier both occupying at least a same resource element within a resource block in a scheduled uplink transmission from a UE. The network entity may further determine that the UE should transmit the DMRS according to an adjusted DMRS pattern. Moreover, the network entity may transmit the adjusted DMRS pattern to the UE on a downlink communication channel.

Additional features of the present aspects are described in more detail below with respect to FIGS. 1-5.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include at least one UE 110 with a modem 140 having a collision mitigation component 170 that may adjust, via a DMRS pattern determination component 172, a DMRS pattern 176 based on determining that a collision may occur between a DMRS 178 and a DC subcarrier 162. Further, wireless communication network 100 may include at least one base station 105 with a modem 160 including an collision detection component 150 that may determine an uplink transmission limiting scenario via the uplink limitation determination component 174 based on one or more channel conditions and transmit an indication to the UE 110 denoting the uplink transmission limiting scenario.

For example, with respect to the DC subcarrier 162 at the UE 110 (e.g., the transmitter), the UE 110 may assume that the transmit DC subcarrier 162 at the transmitter side (e.g., gNB) may be modulated such that data is neither rate-matched nor punctured. Further, the signal quality requirements (e.g., EVM) corresponding to DC subcarriers may be set by the network. The forgoing may be performed with respect to downlink transmissions. However, for the uplink, transmit DC subcarrier 162 at the transmitter side (e.g., UE 110) may be modulated such that data is neither rate-matched nor punctured. Moreover, signal quality requirements (e.g., EVM) corresponding to DC subcarriers may be set by the network. The DC subcarrier 162 at the UE 110 should avoid collisions with at least the DMRS 178 transmissions for accurate channel estimation and efficient uplink transmissions. In some aspects, a particular subcarrier may be defined as a candidate position of the DC subcarrier 162, e.g., DC subcarrier is located at the boundary of physical resource blocks (PRBs). Also, the receiver (e.g., gNB) may determine the DC subcarrier 162 location, which may involve semi-static signaling from the UE 110 and/or a defined DC subcarrier 162 location within a resource block (e.g., a defined frequency band). In some aspects, the DC subcarrier 162 may correspond to a DC subcarrier candidate. As such, in the event of a collision between the DC subcarrier 162 and DMRS 178, as determined by the collision detection component 150 and/or the collision mitigation component 170, the DMRS pattern 176 may be adjusted to account for the collision with the DC subcarrier 162.

Specifically, in some aspects, the UE 110 may adjust the DMRS pattern 176 according to various schemes based on an initial DMRS pattern, one or more channel conditions, or semi-static signaling from the base station 105. The UE 110 may initially determine that an upcoming or expected scheduled transmission of the DMRS transmission 178 and the DC subcarrier 162 may result in a collision. In some aspects, a collision may occur when the DMRS 178 occupies or is transmitted on at least one resource that is also occupied by or used for the DC subcarrier 178. That is, the DMRS 178 and the DC subcarrier are overlapping the same resource elements forming the slot within the resource block.

For instance, upon a determination of an upcoming or expected collision between a scheduled DMRS 178 transmission and a DC subcarrier 162, the DMRS pattern determination component 172 may determine a DMRS pattern 176 that either or reduces the detrimental effect of the collision, or avoids the collision entirely. In one example, if the collision of the DMRS 178 with the DC subcarrier 162 cannot be avoided (e.g., and both the UE 110 and the base station 105 are aware of the upcoming collision), then the DMRS pattern 176 for the UE 110 may be adjusted via the DMRS pattern determination component 172. Specifically, the DMRS pattern 176 may be changed to one that may handle the collision with the DC subcarrier 162 more effectively, thereby reducing the negative effects on channel estimation and uplink transmission, as further described herein with respect to FIGS. 2A and 2B. In another example, the DMRS pattern determination component 172 may adjust the DMRS pattern 176 in the resource blocks in a region around the DC 162 tone. For instance, the DMRS pattern 176 may be adjusted for four PRBs on both sides of the DC 162 tone, whereas the DMRS pattern 176 of the remaining PRBs may not change, as further described herein with respect to FIG. 2D. In some aspects, the DC subcarrier 162 may also be referred to as a DC tone.

Further, in some aspects, adjusting the DMRS pattern 176 may occur when the allocation of resources for the UE 110 is less than or equal to 'X' PRBs and/or when the precoding resource group (PRG) size is less than or equal to 'Y' PRG. For example, if a PRG size is set to a defined value, the receiver (e.g., gNB) may assume that the same precoder is applied over a consecutive number RBs equal to the defined value, and thereby may perform channel estimation over the consecutive number RBs equal to the defined value. In some aspects, the higher the PRG, the lower the effect that a collision may have as there may be more resource elements for channel estimation. On the other hand, if the resource allocation is large and the number of PRB is reasonably large (e.g., greater than 'X'), then even if there is a collision, there may not be a corresponding performance loss. Similarly, if the resource allocation is large, and if the PRG is small, e.g., 2 PRBs, then the base station 105 may perform channel estimation using 2 PRBs at a time such that the PRBs that contain the DC 162 may experience some loss in performance. Moreover, in the event of a collision of DMRS 178 with DC 162, the PRG may be configured to be large, i.e., greater than 'Y' (e.g., both the base station 105 and the UE 110 may agree that the PRG may be at least 4).

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., 51, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of resource blocks for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

A UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

One or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Referring to FIGS. 2A-2D, for instance, various transmission schemes are shown according to distinct DMRS patterns. The transmission schemes may include or otherwise be formed of a plurality of resource elements. As such, each designated region or portion may be formed of one or more resource elements. The transmission schemes may be a slot 204 of a defined length of a number of symbols along the time domain (e.g., 14 or 28 symbols). Further, the transmission schemes may include one or more resource blocks including a resource block 202 that includes at least 12 subcarriers (e.g., along the frequency domain). The transmission schemes may include a control region 206 for downlink control data (e.g., 1 symbol length), a gap region 208 (e.g., 1 symbol length), a DMRS region according to a DMRS pattern 210a-g (e.g., 1 symbol length), a data region 212 (e.g., 9 symbols), a DC subcarrier 218 (e.g., spanning across all symbols), and an uplink common burst 214 (e.g., 2 symbols). In some aspects, the data 212 region may be for uplink transmission on a physical uplink shared channel (PUSCH). In some aspects, the uplink common burst 214 may be based on a grant, and may include resources common across one or more UEs (sounding reference signal (SRS), pilots for uplink, etc.).

The DMRS patterns 210a-g may include distinct comb patterns by which the DMRS 178 may be transmitted. For example, a single comb pattern (e.g., second DMRS pattern 210b) may allocate all resources of one OFDM symbol for a single UE such as UE 110 for DMRS transmissions. As such, all resource elements within the resource block allocated for DMRS may be used by a single UE. However, a two comb pattern (e.g., first DMRS pattern 210a) may allocate every other resource element of one OFDM symbol within a resource block to one UE for DMRS, and the remaining resource elements to another UE. For example, in a two comb DMRS pattern, every even resource element may be allocated or assigned to one UE such as UE 110, and every odd resource element may be allocated or assigned to another UE (or vice versa). In some aspects, a resource block such as resource block 202 may refer to or otherwise include a region across 'M' subcarrier and 'N' OFDM symbols (e.g., M=12 and N=14).

Figure 2A:
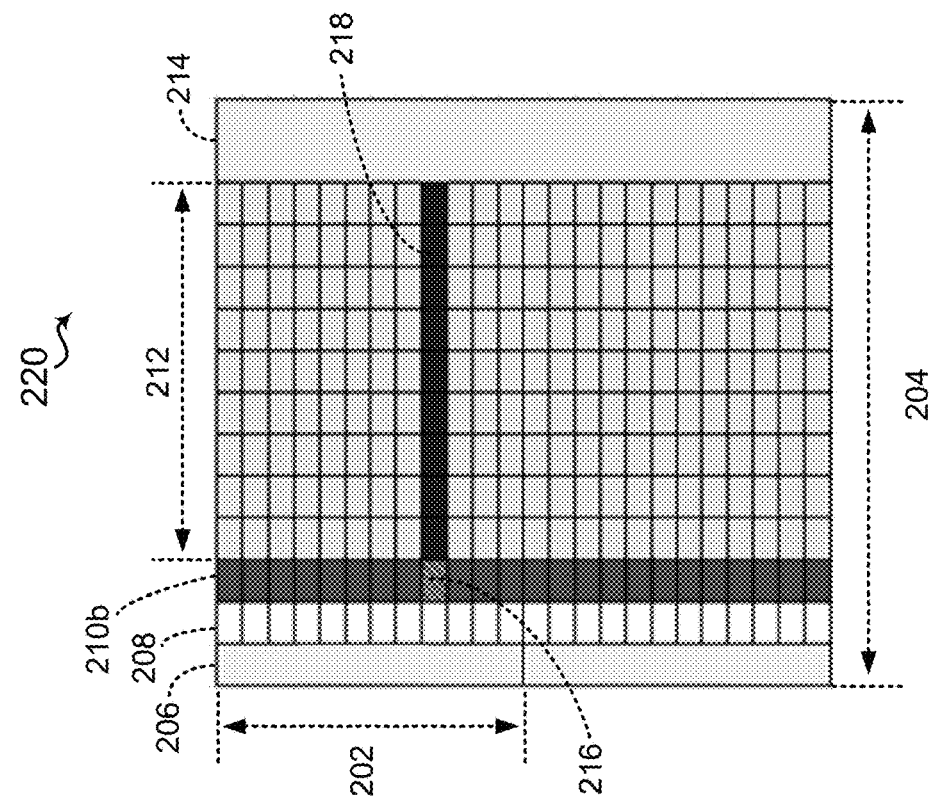
FIGS. 2A-2D are conceptual diagrams of transmissions for one or more resource block according to various DMRS patterns.
Figure 2A:
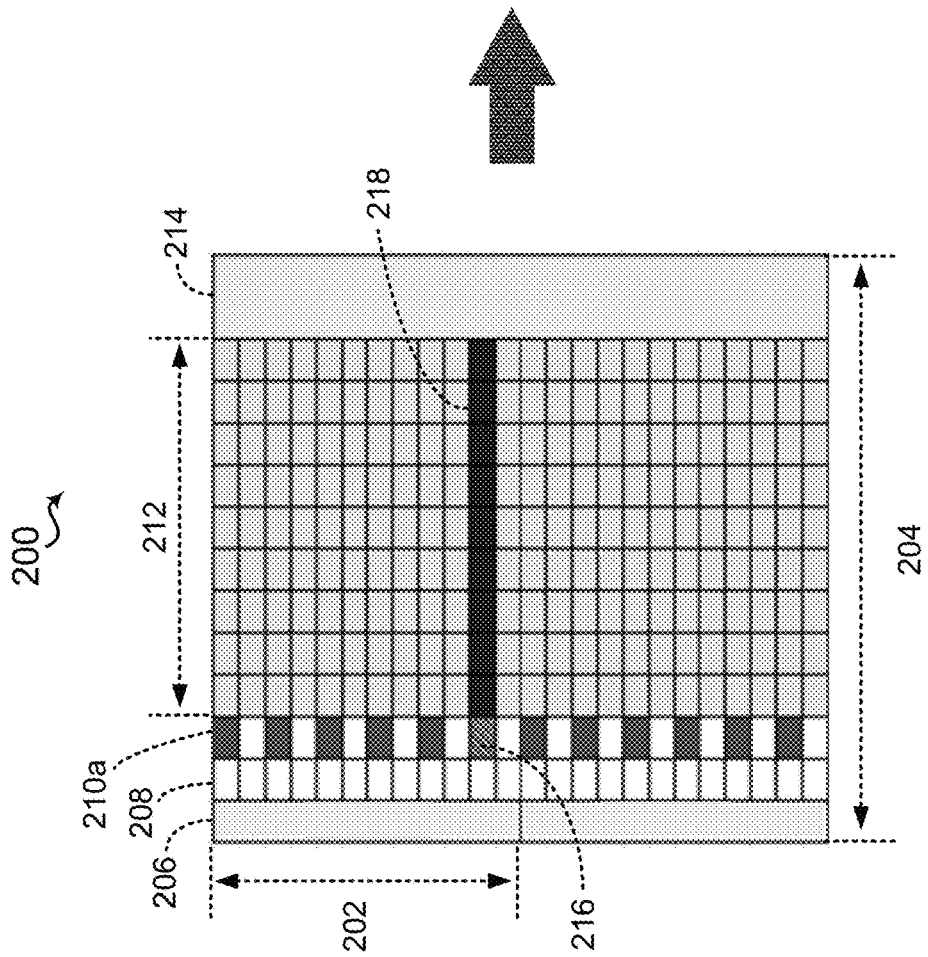

FIG. 2A shows a conceptual diagram of a first transmission scheme 200 having a first DMRS pattern 210a and a second transmission scheme 220 having a second DMRS pattern 210b. For example, the first comb pattern 210a may correspond to a two comb pattern. Further the first transmission scheme 200 and second transmission scheme 220 may each have two cyclic shifts. As such, the first DMRS pattern 210a may be one with two combs and two cyclic shifts. The UE 110 may be scheduled (e.g., by base station 105) to transmit the DMRS 178 in the comb 216 of first DMRS pattern 210a that contains the DC 162 tone, which may result in a collision 216 and poor channel estimation. Accordingly, the UE 110 may adjust to the second DMRS pattern 210b of the second transmission scheme 220 to transmit using the single comb pattern.

The second DMRS pattern 210b may be applied to or may be adjusted across the entire scheduled bandwidth. That is, in some aspects, the second DMRS pattern 210b may be adjusted for an entire allocation (e.g., for all resource blocks), and not just for the resource elements surrounding the DC 162. Further, although collision 216 is not avoided in the second transmission scheme 220, the channel estimation loss in losing one pilot may be smaller in the second DMRS pattern 210b compared to the first DMRS pattern 210a of the first transmission scheme 200 because the percentage of pilots lost is smaller (e.g., losing 1 out of 12 resource elements according to the DMRS pattern 210 compared to 1 out of 24 resource elements in the second DMRS pattern 210b). Also, in the first DMRS pattern 210a there may be a gap of three resource elements when collision 216 occurs, thereby resulting in an interpolation across multiple gaps compared to one gap for the second DMRS pattern 210b.

The receiver, or base station 105, may be aware of the DMRS adjustment or expected DMRS adjustment (e.g., from the first DMRS pattern 210a to the second DMRS pattern 210b) based on the scheduling of the DMRS 178 transmission at the DC 162 tone by the base station 105. In some aspects, the base station 105 and the UE 110 may coordinate or may have coordinated the adjusted DMRS pattern (e.g., second DMRS pattern 210b) to use in the event of a collision 216. However, in some aspects, the base station 105 may, via semi-static signaling, transmit an indication to the UE 110 indicating the adjusted DMRS pattern to use when collision 216 occurs.

Figure 2B:
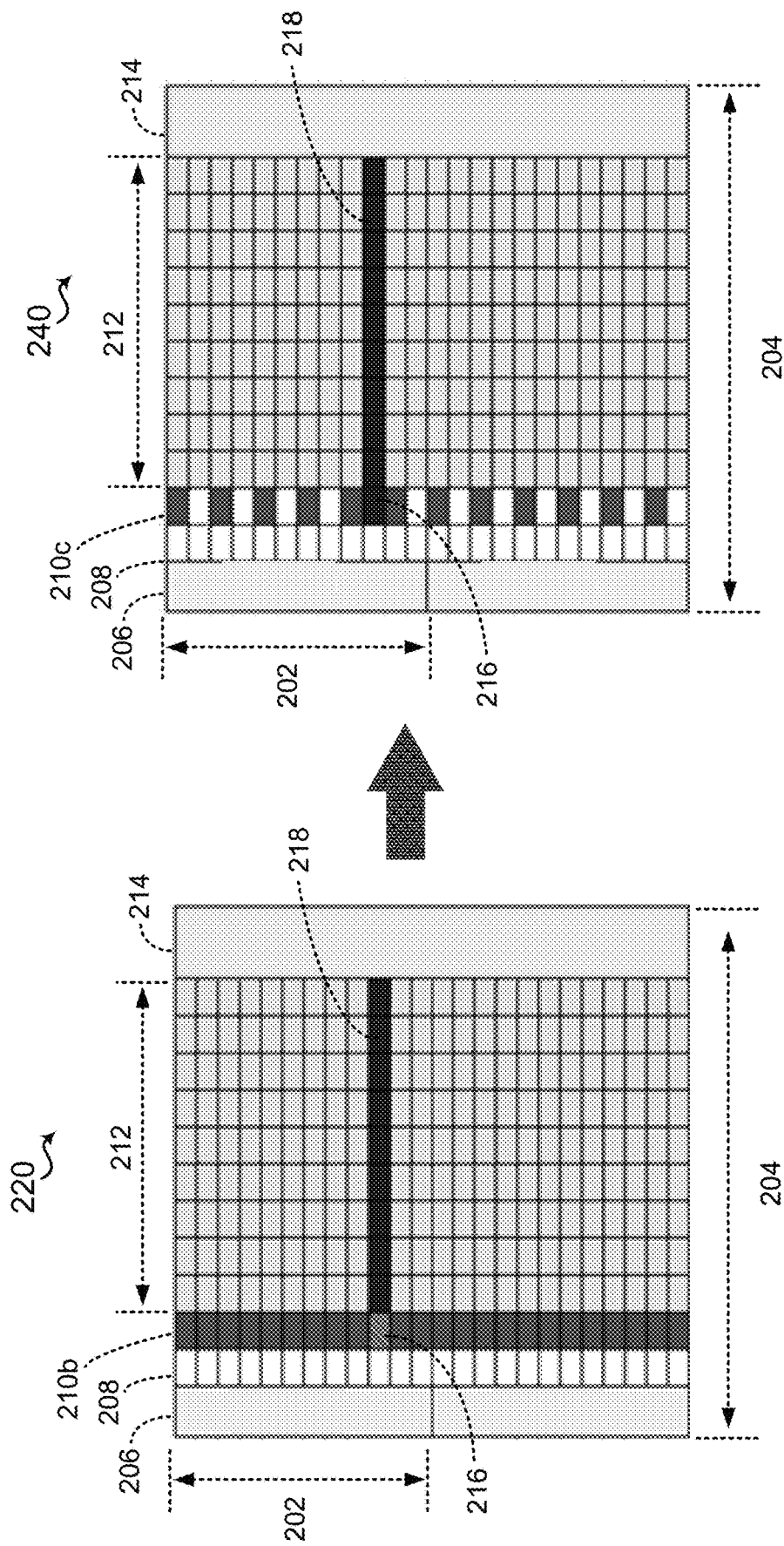

FIG. 2B shows a conceptual diagram of an adjustment of a DMRS pattern from the second DMRS pattern 210b to a third DMRS pattern 210c. The second transmission scheme 220 includes an scheduled transmission of DMRS 178 according to the second DMRS pattern 210b colliding with the DC subcarrier 218. For example, the second DMRS pattern 210b may correspond to a single comb DMRS pattern. The UE 110 may initially be configured to transmit according to the second DMRS pattern 210b. However, when an increase in transmit power (e.g., double the power) is available and/or channel conditions at the receiver are adequate as indicated by the base station 105, the UE 110 may adjust from the second DMRS pattern 210b to a third DMRS pattern 210c as shown in a third transmission scheme 240. The third DMRS pattern 210c ensures that no associated resource element overlaps with the DC 162 tone. That is, none of the DMRS 178 transmissions of the third DMRS pattern 210c collide with the DC subcarrier 162. For example, a two comb DMRS pattern, or any comb-based pattern greater than one, may configure a location of DMRS 178 and the DC subcarrier 162 in non-overlapping resource elements.

As such, even though the number of resource elements is reduced (e.g., from 12 resource elements in the second DMRS pattern 210b to 6 in the third DMRS pattern 210c), the gain from an increase in transmit power outweighs the decrease in the number of resources used for DMRS transmission (e.g., half the resources). That is, if channel conditions at the receiver (e.g., gNB) are sufficient, the increase in transmit power, if possible by the UE 110, or power boost, may compensate for the reduction in resources allocated for DMRS. The third DMRS pattern 210c may include two cyclic shifts. Such adjustment to the third DMRS pattern 210c from the second DMRS pattern 210b may provide gains in noise limited scenarios but not in interference limited scenarios, or in general such an adjustment would provide gains when the power boosting may compensate for the reduction of the resources for DMRS.

Figure 2C:
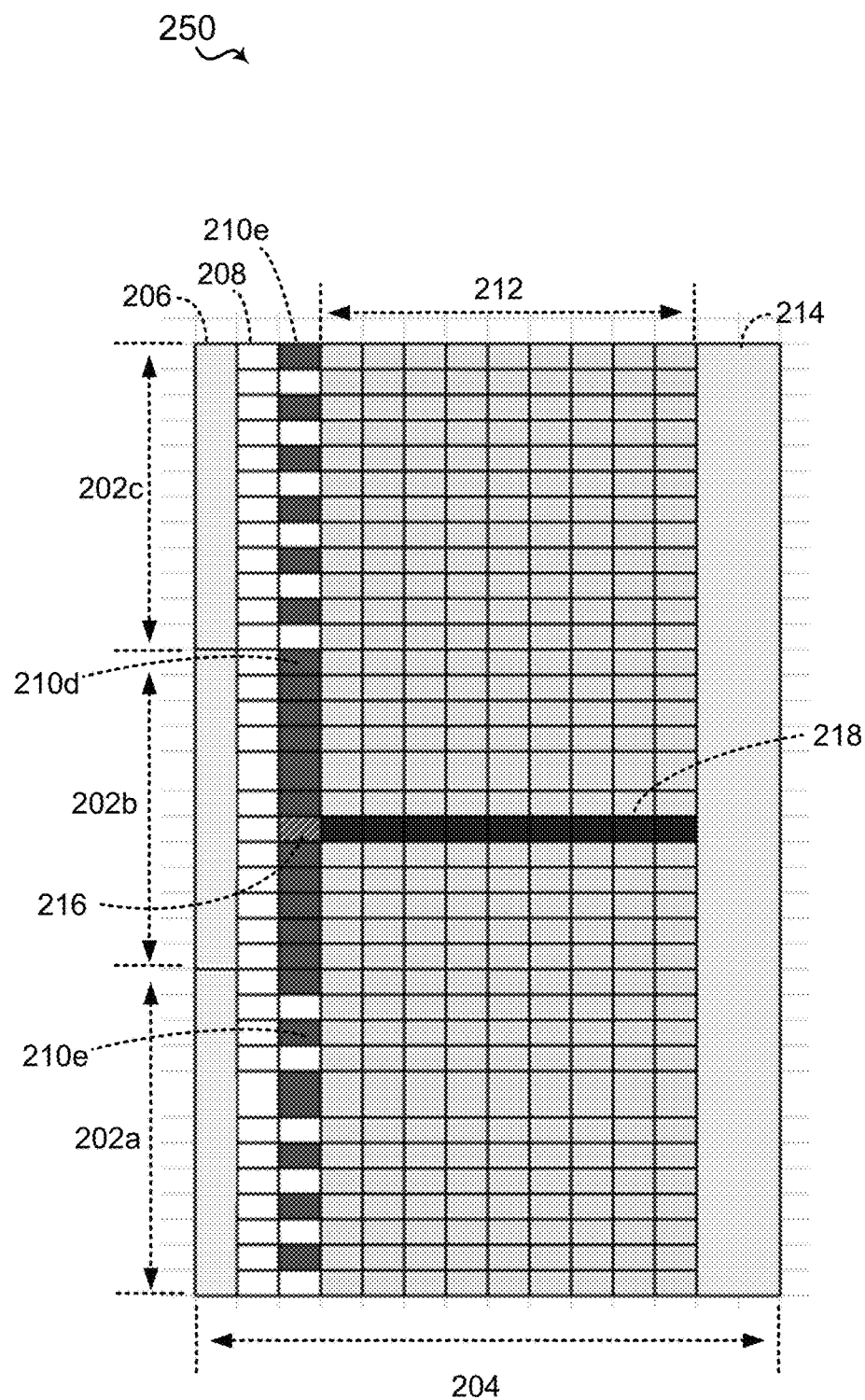

FIG. 2C shows a conceptual diagram of a fourth transmission scheme 250 including an adjusted DMRS pattern 210d in a region surrounding the resource element where the collision 216 is scheduled to occur. For example, within resource block 202b, a collision 216 between the DMRS 178 and a DC subcarrier 178 at a particular resource element may be scheduled to occur. Accordingly, the UE 110 may use an adjusted DMRS pattern 210d rather than the initial DMRS pattern 210e within the resource block 202b where the collision may occur. The adjusted DMRS pattern 210d may correspond to a single comb DMRS pattern where an increase in the number of resource elements for DMRS may mitigate the effect of losing one resource element to the collision with the DC tone 162. However, within resource blocks 202a and 202c, no such collision exists or may be expected to take place, and as such, the initial DMRS pattern 210e may not be adjusted.

However, the adjusted DMRS pattern 210d may be provided in a region of the resource blocks around the DC tone 162. In one example, the DMRS pattern may be adjusted for 'X' number of resource blocks around the DC tone 162, whereas the DMRS pattern 210e of remaining resource blocks 202a and 202c may not change. The fourth transmission scheme 250 may include an adjusted DMRS pattern 210d for the resource blocks that contain the DC tone 162 and/or where collision occurs. In such instance, a two comb DMRS pattern corresponding to the initial DMRS pattern 210e may be adjusted to a single comb DMRS pattern 210d. In some aspects, equal number of resource blocks may change to an adjusted DMRS pattern from either side of the resource allocation. In such a scenario, the receiver, or base station 105, may get an enhanced channel estimation around the affected region, and decrease the impact of the DC subcarrier 162 collision with the DMRS 178.

Figure 2D:
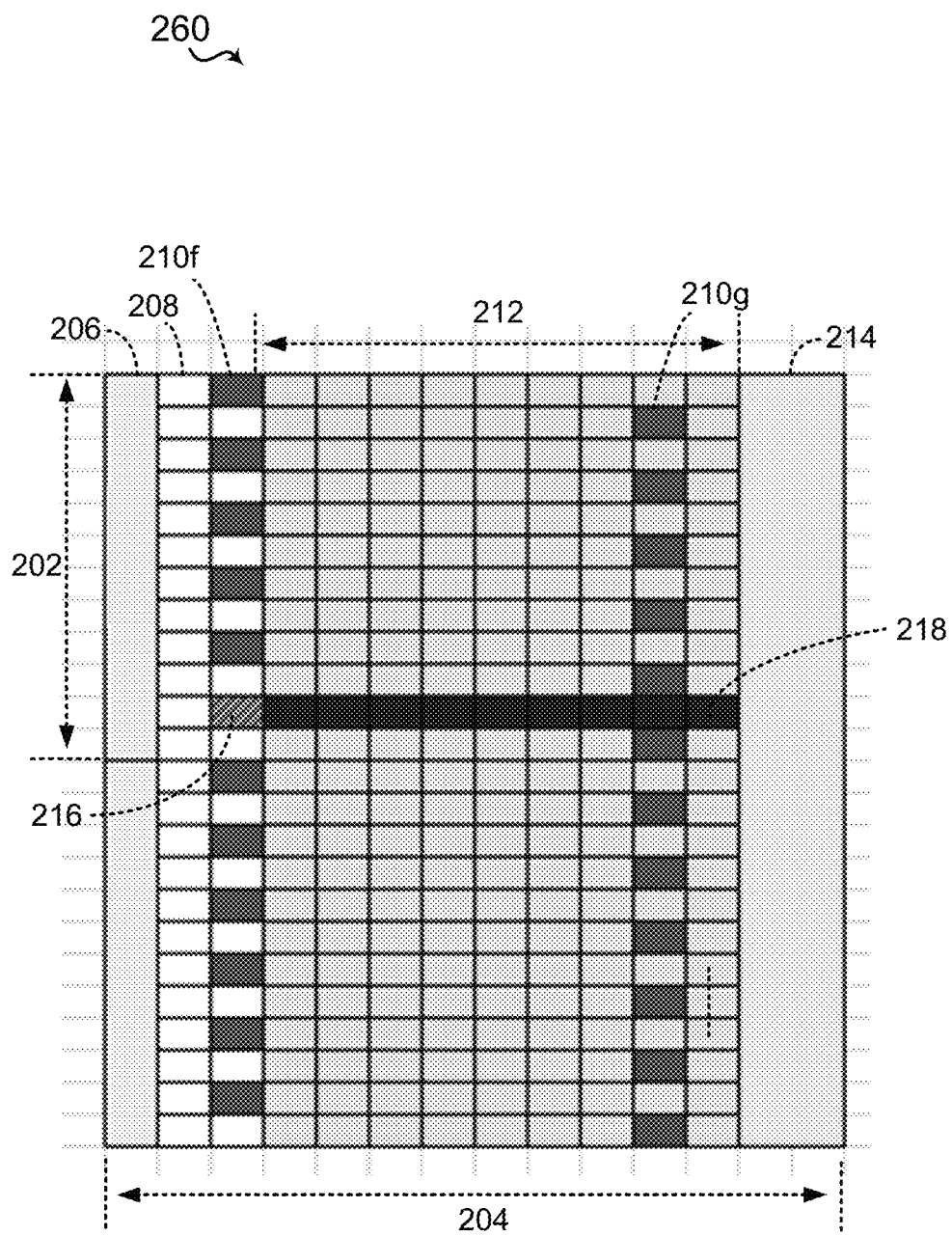

FIG. 2D shows a conceptual diagram of a fifth transmission scheme 260 including at least two symbols allocated for DMRS transmission. For example, the UE 110 may, upon detecting a collision 216 between the DMRS 178 and the DC tone 162 on a particular resource element, schedule or allocate an additional symbol for another DMRS transmission non-overlapping or not colliding with the DC subcarrier 218 within the same slot and/or resource block 202. When collision occurs, the additional DMRS 210g may be staggered in the sense that the collision is avoided in the second OFDM symbol. That is, when collision happens, the UE 110 may also transmit an additional DMRS 210g with such a pattern. Both the base station 105 and the UE 110 may be aware of the adjustment without signaling between the two entities.

Figure 3:
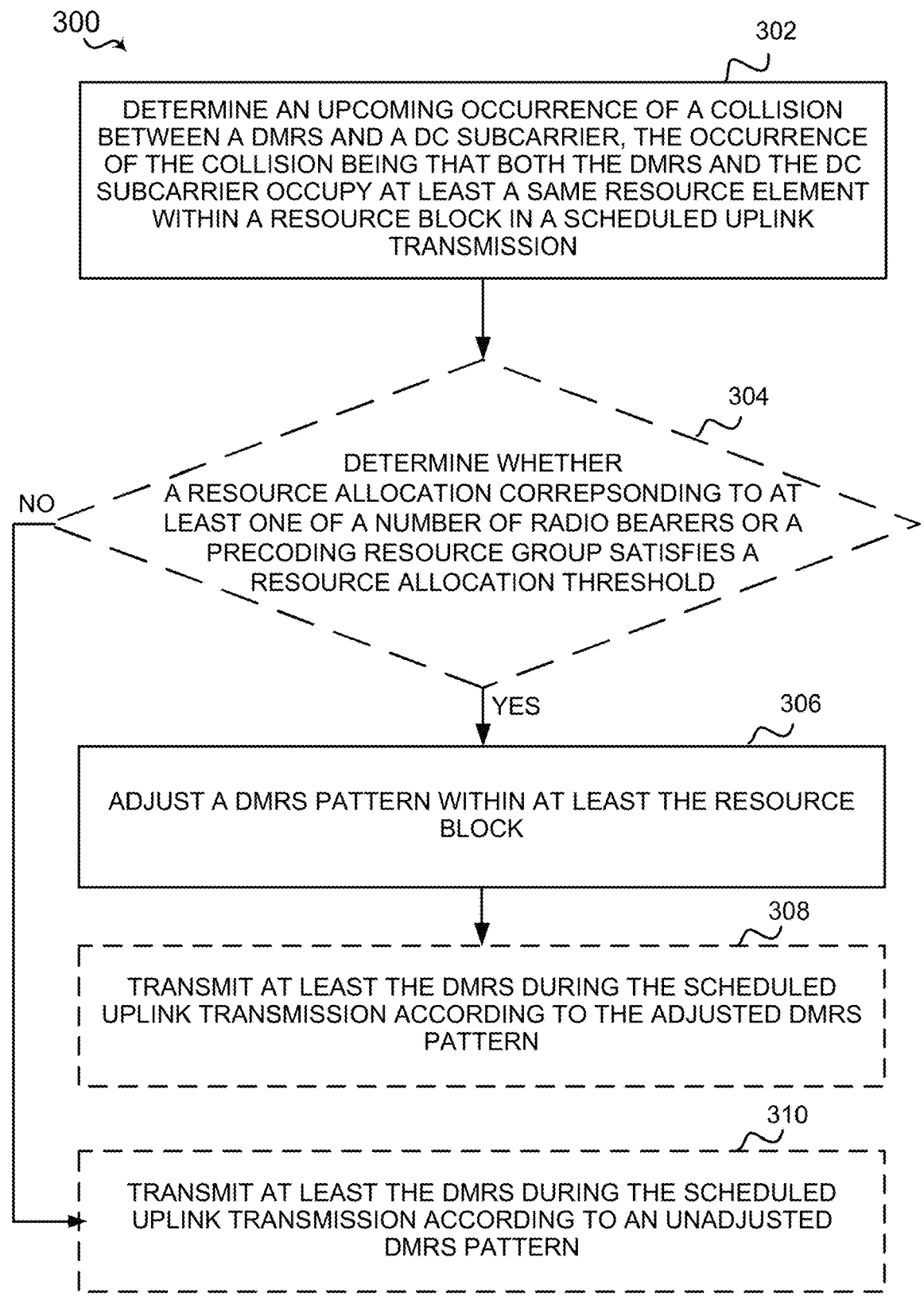
FIG. 3 is a flow diagram of an example of a method of wireless communication at a UE.

Referring to FIG. 3, for example, a method 300 of wireless communication in operating a UE, such as UE 110, according to the above-described aspects to adjust a DMRS pattern may include one or more of the herein-defined actions. The blocks illustrated as having dashed lines may be optional.

At block 304, method 300 may determine an upcoming occurrence of a collision between a DMRS and a DC subcarrier, the occurrence of the collision being that both the DMRS and the DC subcarrier occupy at least a same resource element within a resource block in a scheduled uplink transmission. For example, as described herein, the UE 110 may execute the modem 140 and/or collision mitigation component 170 to determine an upcoming occurrence of a collision 216 between a DMRS 178 and a DC subcarrier 162, the occurrence of the collision being that both the DMRS 178 and the DC subcarrier 162 occupy at least a same resource element within a resource block 202 in a scheduled uplink transmission.

At block 304, the method 300 may determine whether a resource allocation corresponding to at least one of a number of resource blocks or a precoding resource group satisfies a resource allocation threshold. For example, as described herein, the UE 110 may execute the modem 140 and/or collision mitigation component 170 to determine whether a resource allocation corresponding to at least one of a number of resource blocks or a precoding resource group satisfies a resource allocation threshold. In some aspects, the resource allocation threshold may represent a minimum number of allocated resources for triggering adjustment of the DMRS pattern.

At block 306, the method 300 may adjust a DMRS pattern within at least the resource block. For example, as described herein, the UE 110 may execute the modem 140 and/or DMRs pattern determination component 172 to adjust a DMRS pattern 176 within at least the resource block 202 based on determining the upcoming occurrence of the collision between the DMRS 176 and the DC subcarrier 162 both occupying the at least a same resource element of the resource element 202 in the scheduled uplink transmission.

In some aspects, adjusting the DMRS pattern 176 may include adjusting a number of combs of the DMRS pattern 176. In some aspects, adjusting the number of combs of the DMRS pattern 176 may include adjusting from a comb DMRS pattern greater than one (e.g., two comb DMRS pattern) to a single comb DMRS pattern. In some aspects, adjusting from the comb DMRS pattern greater than one to the single comb DMRS pattern corresponds to an increase in a number of resource elements available for DMRS transmissions and correspondingly channel estimation. In some aspects, the DMRS 178 and the DC subcarrier 162 may maintain overlap (e.g., still collide) within at least one resource element of the single comb DMRS pattern following adjustment of the DMRS pattern 176.

In some aspects, adjusting the number of combs of the DMRS pattern 176 may include adjusting from a single comb DMRS pattern 176 to a comb DMRS pattern greater than one based on determining that the transmit power increase is available for the scheduled uplink transmission, and foregoing adjustment of the DMRS pattern 176 based on determining that the transmit power increase is not available for the scheduled uplink transmission.

In some aspects, adjusting the DMRS pattern 176 within the at least the resource block may include adjusting the DMRS pattern 176 based on determining that the resource allocation corresponding to at least one of the number of resource blocks or the precoding resource group satisfies the resource allocation threshold, and foregoing adjustment of the DMRS pattern 176 based on determining that the resource allocation corresponding to at least one of the number of resource blocks or the precoding resource group does not satisfy the resource allocation threshold.

In some aspects, the scheduled uplink transmission may include the resource block and at least one additional resource block, and adjusting the number of combs of the DMRS pattern 176 may include adjusting the number of combs for at least a portion of the resource block, and foregoing adjustment of the number of combs for the at least one additional resource block.

In some aspects, adjusting the DMRS pattern 176 may include allocating one or more additional resource elements in at least one OFDM symbol within a slot of the scheduled uplink transmission for a subsequent DMRS that is non-overlapping with the DC subcarrier.

In some aspects, the DMRS pattern 176 may be associated with a first configuration type. For example, the first configuration type may be one of comb-based with comb-2 or non-comb-based. In some aspects, adjusting the DMRS pattern 176 may include selecting a second configuration type different from the first configuration type. For example, the second configuration type may be a different one of comb-based with comb-2 or non-comb-based.

In some aspects, although not shown, the method 300 may determine whether a transmit power increase is available for the scheduled uplink transmission. In some aspects, the comb DMRS pattern 176 greater than one may be configured for the DMRS 178 and the DC subcarrier 162 to be in non-overlapping resource elements of the resource block. In some aspects, determining whether the transmit power increase is available may include receiving an indication from a network entity (e.g., base station 105) notifying the UE 110 of at least one of an unavailability of the transmit power increase or channel conditions at the network entity, the channel conditions corresponding to at least one of interference or noise limitations at the network entity. In some aspects, adjusting the number of combs of the DMRS pattern 176 may include foregoing adjustment of the DMRS pattern 176 based on receiving the indication from the network entity.

At block 308, the method 300 may transmit at least the DMRS during the scheduled uplink transmission according to the adjusted DMRS pattern. For instance, as described herein, the UE 110 may execute transceiver 502 and/or RF front end 588 to transmit at least the DMRS 178 during the scheduled uplink transmission according to the adjusted DMRS pattern.

At block 310, the method 300 may transmit at least the DMRS during the scheduled uplink transmission according to an unadjusted DMRS pattern. For instance, as described herein, the UE 110 may execute transceiver 502 and/or RF front end 588 to transmit at least the DMRS 178 during the scheduled uplink transmission according to an unadjusted DMRS pattern.

In some aspects, although not shown, the method 300 may receive an indication from a network entity (e.g., base station 105) identifying the adjusted DMRS pattern. In some aspects, the DMRS pattern 176 may be adjusted for an entire resource allocation including the resource block 202.

Figure 4:
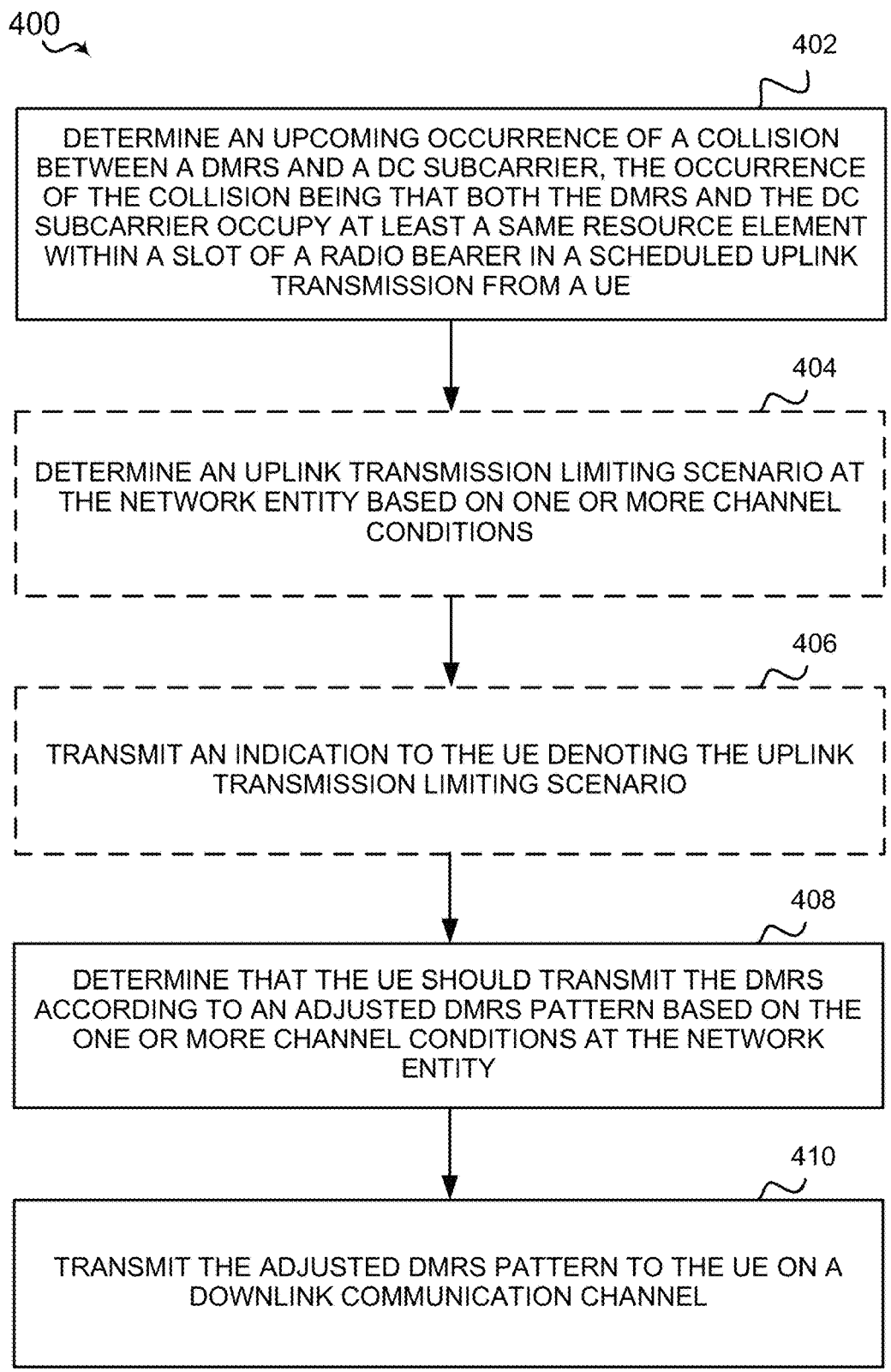
FIG. 4 is a flow diagram of an example of a method of wireless communication at a network entity.

Referring to FIG. 4, for example, a method 400 of wireless communication at a network entity (e.g., base station 105) according to the above-described aspects to determine a DMRS-DC collision and transmit an indication to at least one UE 110 indicating at least one of an adjusted DMRS pattern or an uplink transmission limiting scenario includes one or more of the herein-defined actions. The blocks illustrated as having dashed lines may be optional.

At block 402, the method 400 may determine an upcoming occurrence of a collision between a DMRS and a DC subcarrier, the occurrence of the collision being that both the DMRS and the DC subcarrier occupy at least a same resource element within a resource block in a scheduled uplink transmission from a UE. For example, as described herein, the base station 105 and/or modem 160 may execute collision detection component 150 to determine an upcoming occurrence of a collision 216 between a DMRS 178 and a DC subcarrier 162, the occurrence of the collision being that both the DMRS 178 and the DC subcarrier 162 occupy at least a same resource element within a resource block in a scheduled uplink transmission from a UE 110.

At block 404, the method 400 may determine an uplink transmission limiting scenario at the network entity based on one or more channel conditions. For example, as described herein, the base station 105 and/or modem 160 may execute uplink limitation determination component 172 to determine an uplink transmission limiting scenario at the network entity based on one or more channel conditions. In some aspects, the one or more channel conditions may correspond to at least one of interference or noise limitations at the network entity (e.g., base station 105).

At block 406, the method 400 may transmit an indication to the UE denoting the uplink transmission limiting scenario. For example, as described herein, the base station 105 and/or modem 160 may execute transceiver 602 and/or RF front end 688 to transmit an indication to the UE 110 denoting the uplink transmission limiting scenario.

At block 408, the method 400 may determine that the UE should transmit the DMRS according to an adjusted DMRS pattern based on the one or more channel conditions at the network entity. For example, as described herein, the base station 105 and/or modem 160 may execute uplink limitation determination component 172 to determine that the UE 110 should transmit the DMRS 178 according to an adjusted DMRS pattern 176 based on the one or more channel conditions at the network entity 105.

At block 410, the method 400 may transmit the adjusted DMRS pattern to the UE on a downlink communication channel. For example, as described herein, the base station 105 and/or modem 160 may execute transceiver 602 and/or RF front end 688 to transmit the adjusted DMRS pattern 176 to the UE 110 on a downlink communication channel. In some aspects, the adjusted DMRS pattern may include at least one of a single comb DMRS pattern, a comb DMRS pattern greater than one, a varying comb DMRS pattern across an entire resource allocation, or a staggered comb DMRS pattern corresponding to at least two DMRS transmissions within the resource block.

In some aspects, although not shown, the method 400 may receive the uplink transmission including the DMRS 178 according to the adjusted DMRS pattern.

Figure 5:
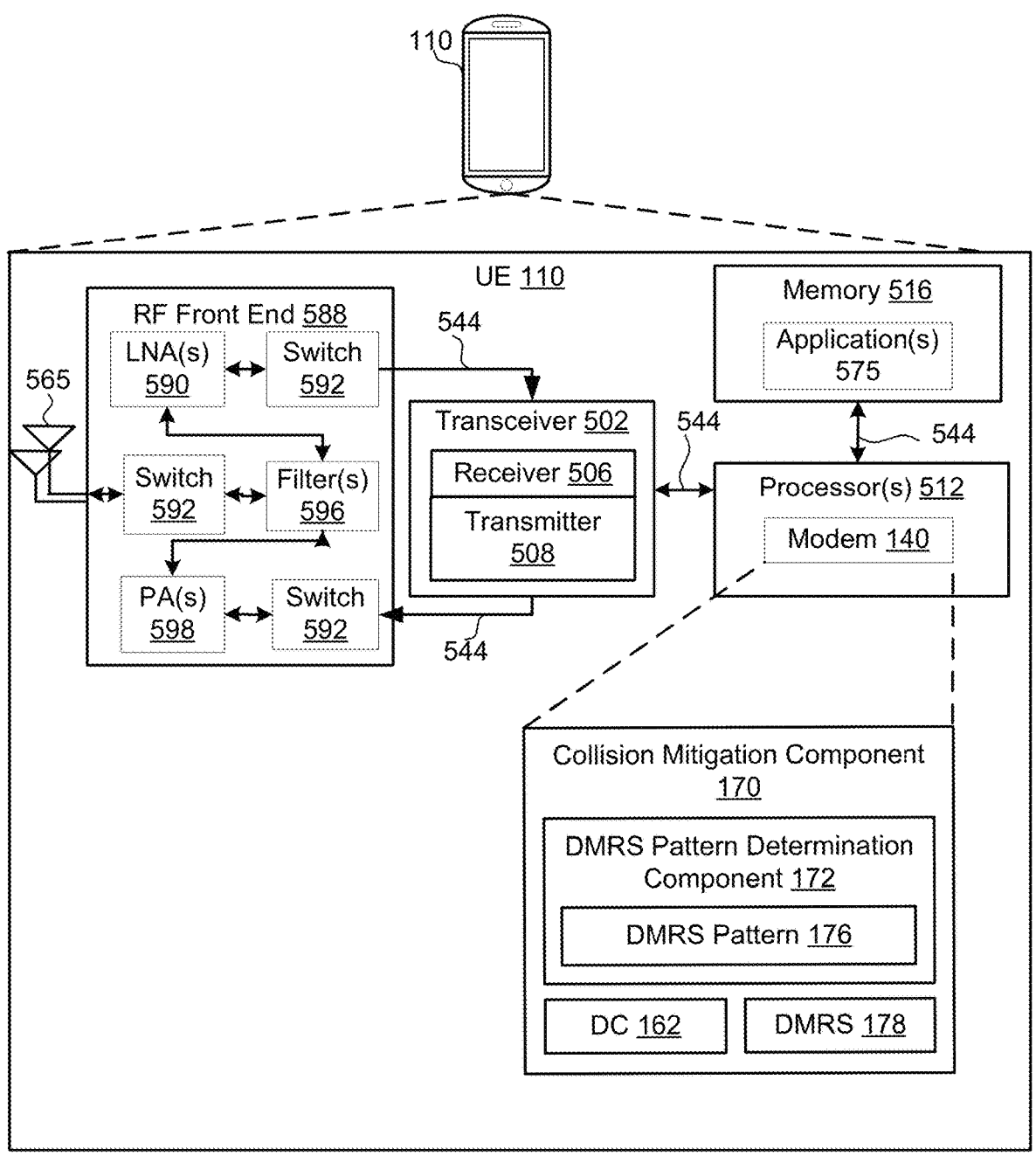
FIG. 5 is a schematic diagram of example components of the UE of FIG. 1.

Referring to FIG. 5, one example of an implementation of UE 110 may include a variety of components, some of which have already been described above, but including components such as one or more processors 512 and memory 516 and transceiver 502 in communication via one or more buses 544, which may operate in conjunction with modem 140 and collision mitigation component 170 to enable one or more of the functions described herein. Further, the one or more processors 512, modem 514, memory 516, transceiver 502, radio frequency (RF) front end 588 and one or more antennas 565, may be configured to support voice and/or data calls (simultaneously or non-simultaneously) in one or more radio access technologies. In some aspects, the modem 514 may be the same as or similar to the modem 514.

In an aspect, the one or more processors 512 can include a modem 514 that uses one or more modem processors. The various functions related to resource identification component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 140 associated with resource identification component 150 may be performed by transceiver 502.

The memory 516 may be configured to store data used herein and/or local versions of applications 575 or retransmission component 170 and/or one or more of the subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining resource identification component 150 and/or one or more of its subcomponents, and/or data associated therewith, when UE 110 is operating at least one processor 512 to execute retransmission component 170 and/or one or more of its subcomponents.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a RF receiver. In an aspect, receiver 506 may receive signals transmitted by at least one base station 125. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may include, but is not limited to, an RF transmitter.

Moreover, in an aspect, UE 110 may include RF front end 588, which may operate in communication with one or more antennas 565 and transceiver 502 for receiving and transmitting radio transmissions, for example, wireless communications transmitted by at least one base station 125 or wireless transmissions transmitted by UE 110. RF front end 588 may be communicatively coupled with one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and a corresponding specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be communicatively coupled with a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 110 can communicate with, for example, one or more base stations 125 or one or more cells associated with one or more base stations 125. In an aspect, for example, modem 140 can configure transceiver 502 to operate at a specified frequency and power level based on the UE configuration of the UE 110 and the communication protocol used by modem 140.

In an aspect, modem 140 can be a multiband-multimode modem, which can process digital data and communicate with transceiver 502 such that the digital data is sent and received using transceiver 502. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 6:
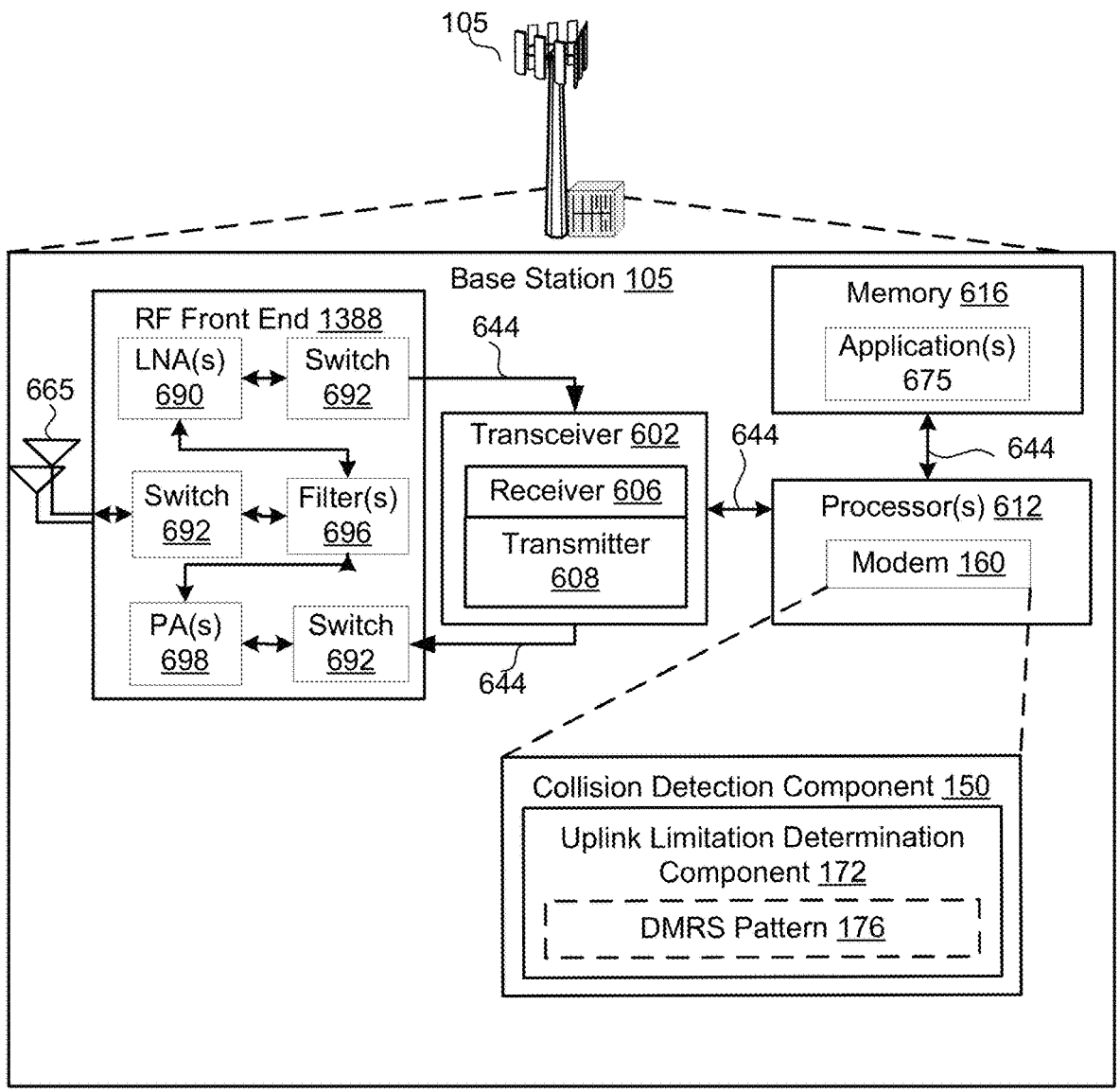
FIG. 6 is a schematic diagram of example components of the base station of FIG. 1.

Referring to FIG. 6, one example of an implementation of base station 105 may include a variety of components, some of which have already been described above, but including components such as one or more processors 612, a memory 616, and a transceiver 602 in communication via one or more buses 644, which may operate in conjunction with modem 160 and collision detection component 150 to enable one or more of the functions described herein.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a user equipment (UE), comprising:
    determining an upcoming occurrence of a collision between a first signal and a direct current (DC) subcarrier, the occurrence of the collision being that both the first signal and the DC subcarrier occupy at least a same resource element of a resource block in a scheduled uplink transmission; and
    adjusting a first signal pattern within at least the resource block based on determining the upcoming occurrence of the collision.

2. The method of claim 1, wherein adjusting the first signal pattern includes adjusting a number of combs of the first signal pattern.

3. The method of claim 2, wherein adjusting the number of combs of the first signal pattern includes adjusting from a comb first signal pattern greater than one to a single comb first signal pattern.

4. The method of claim 3, wherein adjusting from the comb first signal pattern greater than one to the single comb first signal pattern corresponds to an increase in a number of resource elements available for channel estimation.

5. The method of claim 3, wherein the first signal and the DC subcarrier maintain overlap within at least one resource element of the single comb first signal pattern following adjustment of the first signal pattern.

6. The method of claim 2, further comprising determining whether a transmit power increase is available for the scheduled uplink transmission,
    wherein adjusting the number of combs of the first signal pattern includes:
        adjusting from a single comb first signal pattern to a comb first signal pattern greater than one based on determining that the transmit power increase is available for the scheduled uplink transmission; and
        foregoing adjustment of the first signal pattern based on determining that the transmit power increase is not available for the scheduled uplink transmission.

7. The method of claim 6, wherein the comb first signal pattern greater than one is configured for the first signal and the DC subcarrier to be in non-overlapping resource elements of the resource block.

8. The method of claim 6, wherein determining whether the transmit power increase is available includes receiving an indication from a network entity notifying the UE of at least one of an unavailability of the transmit power increase or channel conditions at the network entity, the channel conditions corresponding to at least one of interference or noise limitations at the network entity, and
    wherein adjusting the number of combs of the first signal pattern includes foregoing adjustment of the first signal pattern based on receiving the indication from the network entity.

9. The method of claim 2, wherein the scheduled uplink transmission includes the resource block and at least one additional resource block,
    wherein adjusting the number of combs of the first signal pattern includes:
        adjusting the number of combs for at least a portion of the resource block; and
        foregoing adjustment of the number of combs for the at least one additional resource block.

10. The method of claim 1, wherein the first signal pattern is associated with a first configuration type, and
    wherein adjusting the first signal pattern includes selecting a second configuration type different from the first configuration type.

11. The method of claim 1, further comprising determining whether a resource allocation corresponding to at least one of a number of resource blocks or a precoding resource group satisfies a resource allocation threshold,
    wherein adjusting the first signal pattern within at least the resource block includes:
        adjusting the first signal pattern based on determining that the resource allocation corresponding to at least one of the number of resource blocks or the precoding resource group satisfies the resource allocation threshold; and
        foregoing adjustment of the first signal pattern based on determining that the resource allocation corresponding to at least one of the number of resource blocks or the precoding resource group does not satisfy the resource allocation threshold.

12. The method of claim 11, wherein the resource allocation threshold represents a minimum number of allocated resources for triggering adjustment of the first signal pattern.

13. The method of claim 1, wherein adjusting the first signal pattern includes allocating one or more additional resource elements in at least one OFDM symbol within a slot of the scheduled uplink transmission for a subsequent first signal that is non-overlapping with the DC sub carrier.

14. The method of claim 1, further comprising receiving an indication from a network entity identifying the adjusted first signal pattern.

15. The method of claim 1, wherein the first signal pattern is adjusted for an entire resource allocation including the resource block.

16. A method of wireless communications at a network entity, comprising:

determining an upcoming occurrence of a collision between a first signal and a direct current (DC) subcarrier, the occurrence of the collision being that both the first signal and the DC subcarrier occupy at least a same resource element within a resource block in a scheduled uplink transmission from a user equipment (UE);

determining that the UE should transmit the first signal according to an adjusted first signal pattern; and transmitting the adjusted first signal pattern to the UE on a downlink communication channel.

17. The method of claim 16, further comprising:

determining an uplink transmission limiting scenario at the network entity based on one or more channel conditions; and transmitting an indication to the UE denoting the uplink transmission limiting scenario.

18. The method of claim 17, wherein the one or more channel conditions corresponding to at least one of interference or noise limitations at the network entity.

19. The method of claim 16, wherein determining that the UE should transmit the first signal according to the adjusted first signal is based on one or more channel conditions at the network entity.

20. The method of claim 19, further comprising receiving the uplink transmission including the first signal according to the adjusted first signal pattern.

21. The method of claim 19, wherein the adjusted first signal pattern includes at least one of:

a single comb first signal pattern, a comb first signal pattern greater than one, a varying comb first signal pattern across an entire resource allocation, or a staggered comb first signal pattern corresponding to at least two first signal transmissions within the resource block.

22. An apparatus for wireless communications, comprising:

a memory; and a processor coupled to the memory and configured to:

determine an upcoming occurrence of a collision between a first signal and a direct current (DC) subcarrier, the occurrence of the collision being that both the first signal and the DC subcarrier occupy at least a same resource element within a resource block in a scheduled uplink transmission; and adjust a first signal pattern within at least the resource block based on determining the upcoming occurrence of the collision.

23. The apparatus of claim 22, wherein to adjust the first signal pattern, the processor is further configured to adjust a number of combs of the first signal pattern.

24. The apparatus of claim 23, wherein to adjust the number of combs of the first signal pattern, the processor is further configured to adjust from a comb first signal pattern greater than one to a single comb first signal pattern.

25. The apparatus of claim 23, wherein the processor is further configured to determine whether a transmit power increase is available for the scheduled uplink transmission, wherein to adjust the number of combs of the first signal pattern, the processor is further configured to:

adjust from a single comb first signal pattern to a comb first signal pattern greater than one based on determining that the transmit power increase is available for the scheduled uplink transmission; and forego adjustment of the first signal pattern based on determining that the transmit power increase is not available for the scheduled uplink transmission.

26. The apparatus of claim 23, wherein the scheduled uplink transmission includes the resource block and at least one additional resource block, wherein to adjust the number of combs of the first signal pattern, the processor is further configured to:

adjust the number of combs for at least a portion of the resource block; and forego adjustment of the number of combs for the at least one additional resource block.

27. The apparatus of claim 22, wherein the processor is further configured to determine whether a resource allocation corresponding to at least one of a number of resource blocks or a precoding resource group satisfies a resource allocation threshold, wherein to adjust the first signal pattern within at least the resource block, the processor is further configured to:

adjust the first signal pattern based on determining that the resource allocation corresponding to at least one of the number of resource blocks or the precoding resource group satisfies the resource allocation threshold; and forego adjustment of the first signal pattern based on determining that the resource allocation corresponding to at least one of the number of resource blocks or the precoding resource group does not satisfy the resource allocation threshold.

28. The apparatus of claim 22, wherein to adjust the first signal pattern, the processor is further configured to allocate one or more additional resource elements in at least one OFDM symbol within a slot of the scheduled uplink transmission for a subsequent first signal that is non-overlapping with the DC subcarrier.

29. The apparatus of claim 22, wherein the first signal pattern is associated with a first configuration type, and wherein to adjust the first signal pattern, the processor is further configured to select a second configuration type different from the first configuration type.

30. An apparatus for wireless communications, comprising:

a memory; and a processor coupled to the memory and configured to:

determine an upcoming occurrence of a collision between a first signal and a direct current (DC) subcarrier, the occurrence of the collision being that both the first signal and the DC subcarrier occupy at least a same resource element within a resource block in a scheduled uplink transmission from a user equipment (UE);

determine that the UE should transmit the first signal according to an adjusted first signal pattern; and transmit the adjusted first signal pattern to the UE on a downlink communication channel.

* * * * *